United States Patent [19]

Mellors

[11] Patent Number: 4,476,104

[45] Date of Patent: Oct. 9, 1984

[54] MANGANESE DIOXIDE AND PROCESS FOR THE PRODUCTION THEREOF

[75] Inventor: Geoffrey W. Mellors, Royalton, Ohio

[73] Assignee: Union Carbide Corporation, Danbury, Conn.

[21] Appl. No.: 476,639

[22] Filed: Mar. 24, 1983

Related U.S. Application Data

[63] Continuation-in-part of Ser. No. 451,877, Dec. 21, 1982, abandoned.

[51] Int. Cl.$^3$ ............................................. C01G 45/02
[52] U.S. Cl. ..................................... 423/605; 429/224
[58] Field of Search .......................... 423/605; 429/224

[56] References Cited

U.S. PATENT DOCUMENTS

| | | | |
|---|---|---|---|
| 2,885,262 | 5/1959 | Fleischer et al. | 423/605 |
| 4,133,856 | 1/1979 | Ikeda et al. | 423/605 |
| 4,336,315 | 6/1982 | Eda et al. | 429/224 |

FOREIGN PATENT DOCUMENTS 27076 9/1980 European Pat. Off. .
74972 5/1982 Japan .

OTHER PUBLICATIONS

ASTM Card No. 24-735.
A. Kozawa and R. A. Powers, *Proceedings of the First Manganese Dioxide Symposium* pp. 4-9, vol. 1, Cleveland 1975, publishd by the Electrochemical Society, Inc.
J. C. Bailar, Jr. ed. *Comprehensive Inorganic Chemistry* vol. 3 Pergamon Press Oxford England copyright 1973 pp. 798-805.
*Advanced Inorganic Chemistry*, F. A. Cotton and G. Wilkinson (3rd Ed. 1972), p. 852.

*Primary Examiner*—John Doll
*Assistant Examiner*—Jackson Leeds
*Attorney, Agent, or Firm*—William E. Dickheiser

[57] ABSTRACT

Manganese dioxide is produced from manganous nitrate hexahydrate-containing material by heating such manganous nitrate-containing material to about 150° C. under an oxygen-containing atmosphere until a substantially complete decomposition to manganese dioxide has occurred, further elevating the temperature to about 250° C., and maintaining this temperature until the manganese dioxide has a surface area no greater than about 15 m$^2$/gm and a high degree of amorphousness relative to crystalline beta manganese dioxide.

9 Claims, 2 Drawing Figures

MANGANOUS NITRATE DERIVED MnO$_2$

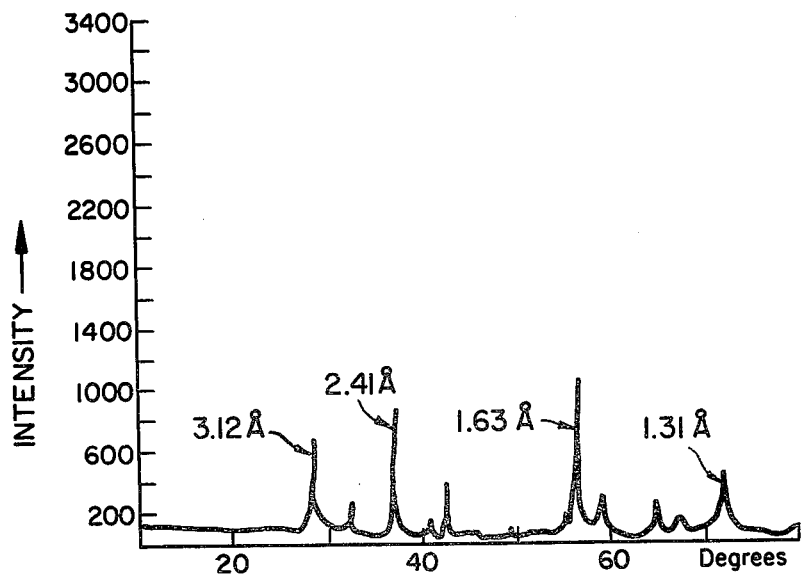
FIG. 1 MANGANOUS NITRATE DERIVED MnO$_2$
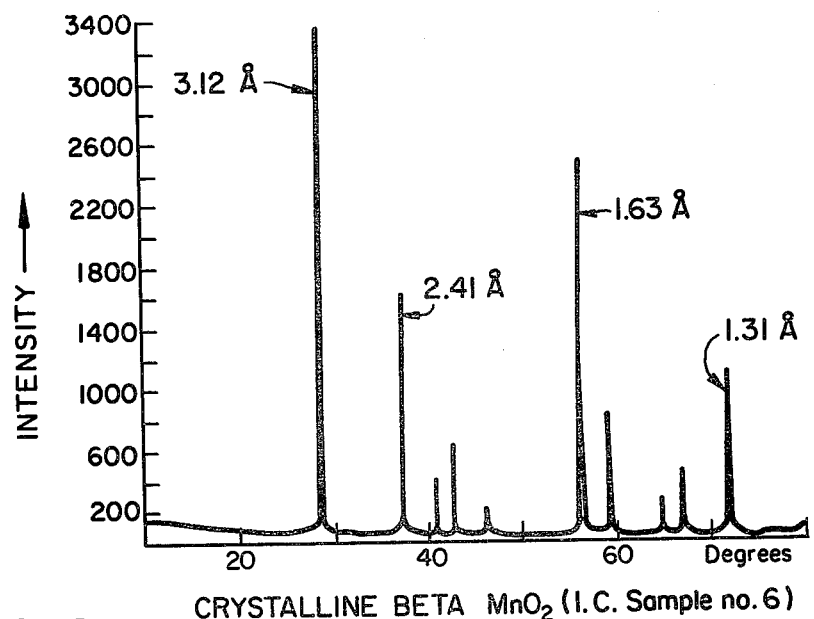
FIG. 2 CRYSTALLINE BETA MnO$_2$ (I.C. Sample no. 6)

MANGANESE DIOXIDE AND PROCESS FOR THE PRODUCTION THEREOF

This application is a continuation-in-part of U.S. application Ser. No. 451,877 filed Dec. 21, 1982 now abandoned.

FIELD OF THE INVENTION

This invention relates to a novel form of manganese dioxide and a process for the production thereof. The manganese dioxide of this invention possesses a low surface area coupled with a high degree of amorphousness. In consequence, it exhibits a high degree of resistance to water pickup as well as desirable electrochemical properties. This manganese dioxide can be produced by heating manganous nitrate hexahydrate-containing material to a temperature of between about 120° and about 180° C. in an oxygen-containing atmosphere until a substantially complete decomposition of the manganous nitrate into manganese dioxide has occurred, further elevating the temperature to between about 210° C. and 300° C., maintaining this higher temperature until the manganese dioxide has a surface area of no greater than about 15 m$^2$/gm and and X-ray diffraction pattern indicating a similar pattern but substantially more amorphousness than the X-ray diffraction pattern of crystalline beta manganese dioxide (pyrolusite).

BACKGROUND OF THE INVENTION

The use of manganese dioxide as an active cathode material (depolarizer) in nonaqueous cells is well known. Among the readily available manganese compounds which have been employed as a source of manganese dioxide is manganous nitrate, which is thermally decomposed to produce manganese dioxide. For example *Advanced Inorganic Chemistry,* F. A. Cotton and G. Wilkinson, published by Interscience—John Wiley and Sons (3rd Ed. 1972) states, at page 852, that manganese dioxide is normally made by heating manganous nitrate hexahydrate in air at a temperature of about 530° C. However, such procedure leads to the production of a highly crystalline beta form of manganese dioxide, or pyrolusite. This material has been used in aqueous batteries of the Leclanche type but in general does not produce as satisfactory results as do other forms of manganese dioxide.

For example, European Pat. No. 27,076 discloses a process for the pyrolysis of manganous nitrate tetrahydrate to form entirely beta type manganese dioxide. More specifically, this process involves heating the Mn(NO$_3$)$_2$·4H$_2$O at 150° C., washing the product so obtained first with warm distilled water and subsequently with 1% ammonium hydroxide solution, and then drying the material at a temperature on the order of 400° C. to 450° C. However when moisture resistant manganese dioxide produced using the process of this patent was employed in lithium/non-aqueous cells, such cells did not yield commercially useful efficiencies at temperatures of 21° C. and 35° C. Applicant believes that the reason for the poor performance at these temperatures of such thermally decomposed manganous nitrate is that the beta manganese dioxide produced possesses a highly crystalline form.

Other approaches for the production of electrochemically useful manganese dioxide from manganous nitrate have also been adopted. Among the more useful of these are processes such as that described in U.S. Pat. No. 4,048,027 which involves producing amorphous electrolytic manganese dioxide ("EMD") by the electrolysis of manganous nitrate hexahydrate. In general EMD, which may be heat treated to reduce its water content as is described in British Pat. No. 1,199,426 and U.S. Pat. No. 4,133,856, possesses desirable electrochemical properties for non-aqueous cell usage. However, even heat-treated EMD picks up water so rapidly upon exposure to ambient humidity that, even in a dry room having a relative humidity of from 3–5%, it is difficult to assemble lithium batteries which will maintain capacity. As is well known in the art, moisture present in MnO$_2$ will react with lithium and/or the nonaqueous electrolyte in a manner which may result in a cell bulging from its initial height. It is therefore an object of this invention to provide a form of manganese dioxide possessing increased resistance to water pickup.

It is also an object of this invention to provide a form of manganese dioxide which possesses a high degree of amorphousness as determined by X-ray diffraction and which is suitable for battery application over a wide range of temperatures.

Further, it is an object of this invention to provide a simple and effective process for the production of a novel form of manganese dioxide from manganous nitrate which is suitable for use in non-aqueous cells.

DESCRIPTION OF THE DRAWING

FIG. 1 shows an X-ray pattern of a typical representative of the manganese dioxide of this invention.

FIG. 2 shows the X-ray pattern of crystalline beta manganese dioxide. (I.C. Sample No. 6 described by A. Kozawa and R. A. Powers in Proceedings of the First Manganese Dioxide Symposium, pg. 4, Volume 1, Cleveland, 1975, published by the Electrochemical Society, Inc. This is essentially the same pattern as that reported as ASTM Card No. 24-735)

SUMMARY OF THE INVENTION

This invention relates to a novel form of manganese dioxide which unexpectedly possesses a low surface area coupled with a high degree of amorphousness. As a consequence of these properties, such manganese dioxide is resistant to water pickup and possesses desirable electrochemical properties. In another aspect, this invention relates to a process for the production of manganese dioxide from manganous nitrate hexahydrate-containing material.

This process involves the steps of:

(a) heating manganous nitrate hexahydrate-containing material to a temperature of between about 120° C. and about 180° C., preferably to about 150° C., in an oxygen-containing atmosphere until a substantially complete decomposition of the manganous nitrate into manganese dioxide has occurred; and (b) further elevating the temperature to between about 210° C. and about 300° C., preferably to about 250° C., and maintaining this temperature until the manganese dioxide produced has a surface area of no more than about 15 m$^2$/gm and an x-ray diffraction pattern which indicates intensities, compared to crystalline beta manganese dioxide (I.C. No. 6) under identical instrumental conditions, of no greater than about 30% at d value 3.12 Å, of no greater than about 80% at d value 2.41 Å, of no greater than about 65% at d value 1.63 Å and of no greater than about 65% at d value 1.31 Å.

The manganese dioxide produced using this process exhibits an X-ray pattern similar to that shown in FIG.

1. Such manganese dioxide possesses a surface area of no more than about 15 $m^2$/gram, preferably less than about 10 $m^2$/gram, and most preferably less than about 5 $m^2$/gram. This manganese dioxide is unexpectedly resistant to water pickup and possesses desirable electrochemical properties.

It is believed that the rate of which a particular form of manganese dioxide will pick up water is directly related to the surface area of such manganese dioxide. It is therefore theorized that the manganese dioxide of this invention exhibits increased resistance to water pickup due to its relatively low surface area. In addition, it is theorized that manganese dioxide which possesses a less ordered form will exhibit superior electrochemical properties relative to manganese dioxide which possesses a highly crystalline structure. It is thus believed that because the manganese dioxide of this invention possesses a relatively amorphous structure it is admirably suited for use in electrochemical cells.

The manganous nitrate which is employed as the starting material in the process of this invention is hexahydrated. However, other species such as anhydrous manganous nitrate, manganous nitrate tetrahydrate, etc. may also be used in conjunction with the manganous nitrate hexahydrate as the starting material. However, it should be noted that the presence of these other species may produce a manganese dioxide product which has an increased surface area relative to the manganese dioxide produced from the use of the hexahydrate alone. Thus, the resistance to water pickup of such product will be reduced accordingly. Procedures for the production of the desired hydrate of manganous nitrate are disclosed in "Nitrate hydrates des Metaux bivalens," D. Weigel, B. Imelik and M. Prettre, Bull. Soc. Chem. Fr. 836 (1964).

The process of this invention is typically carried out in a closed reactor so that the humidity in the reactor may be controlled. The reactor should be equipped with an inlet so that oxygen or an oxygen-containing gas may be pumped in. The reactor should also possess a vent through which the gas liberated by the reaction may exit. An oil-filled trap may be employed in conjunction with such venting means in order to prevent the back diffusion of air or water vapor.

The manganous nitrate starting material is placed in the reactor and a continuous flow of dry or wet oxygen-containing gas is begun. As used herein, the term "dry oxygen-containing gas" refers to a gas which has not been bubbled though water prior to its entry into the reactor. Conversely, the term "wet oxygen-containing gas" refers to a gas which has been bubbled through water prior to its entry into the reactor. The reactor is then preferably slowly heated to between about 120° C. and about 180° C., preferably to about 150° C. Such heating step should take preferably from about 15 to about 30 minutes, although longer or shorter time periods may be employed.

Once the desired temperature has been reached, the system is maintained at such temperature until a substantially complete decomposition of the manganous nitrate into manganese dioxide has occurred. This decomposition is indicated by the formation of a black mass. Typically, such temperature is maintained for a period of between about 1 and about 4 hours, preferably for about 2 hours. As will be recognized by one skilled in the art, this period will depend upon the temperature selected, reaction batch size, the composition of the starting material, as well as upon other similar factors.

The oxygen-containing gas which is fed into the reactor during this constant temperature period may be wet or dry.

After the first heating step discussed above is complete, the reaction product of such step is further heated to between about 210° and about 300° C., preferably to about 250° C. When employed as a single process, this second temperature increase is preferably carried out over a period of between about 15 and about 60 minutes, most preferably over a period of about 20 minutes. This second heating step may take place in the presence of a wet or dry oxygen-containing atmosphere.

Once the desired temperature of this second heating step has been reached, the reaction is maintained at such temperature for a period sufficient to alter the characteristics of the manganese dioxide produced such that the product possesses a surface area of no more than about 15 $m^2$/gm and a degree of amorphousness such that the X-ray diffraction patterns of such manganese dioxide will possess intensities, relative to crystalline beta manganese dioxide (I.C. No. 6), of no greater than about 30% at d value 3.12 Å, of no greater than about 80% at d value 2.41 Å, of no greater than about 65% at d value 1.63 Å and of no greater than about 65% at d value 1.31 Å. Typically, this period is of a duration of between about 1 and about 4 hours, preferably for about 2 hours. Care should be taken to avoid maintaining this higher temperature for too long a period or the product will become too crystalline, approaching the X-ray pattern of pure beta manganese dioxide, which is shown in FIG. 2, and will thus exhibit less desirable electrochemical properties. This latter result may be avoided by periodically subjecting a sample of the manganese dioxide produced to X-ray diffraction analysis. The product may then be allowed to cool to room temperature, such cooling preferably being done in a dry oxygen-containing atmosphere.

The manganese dioxide produced in accordance with the process of this invention exhibits unexpectedly improved resistance to water pickup coupled with desirable electrochemical properties. Such material possesses a surface area of no more than about 15 $m^2$/gram, preferably of no more than about 10 $m^2$/gram and most preferably no more than about 5 $m^2$/gram.

In addition, the manganese dioxide of this invention possesses a high degree of amorphousness. This is seen from a comparison of FIGS. 1 and 2 and from Table I below which summarizes data taken from these FIGURES. As is apparent to one skilled in the art, intensity is measured on an arbitrary scale.

TABLE I

| Spacing | Intensity[1] Manganese Nitrate Derived $MnO_2$(I) | Intensity[1] Beta-$MnO_2$($I_o$) | Relative Intensity[2] (percent) |
|---|---|---|---|
| 3.12Å | 700 | 3400 | 21 |
| 2.41Å | 900 | 165 | 55 |
| 1.63Å | 1100 | 2500 | 44 |
| 1.31Å | 500 | 1150 | 43 |

It is thus apparent that the manganese dioxide of this invention, as typified by the sample shown in FIG. 1, is substantially more amorphous than is crystalline beta manganese dioxide.

The preferred manganese dioxide of the instant invention should generally pick up no more than about 750 parts per million water in 5 hours when exposed to an atmosphere possessing a relative humidity of 20% at a temperature of 21° C.

EXAMPLES

The following Examples are intended to further illustrate the invention and are not intended to limit the scope of the invention in any manner.

EXAMPLE 1

A quantity of manganous nitrate hexahydrate was prepared by the dehydration, in a vacuum desiccator at 5° C. over sulphuric acid, of a 50% manganous nitrate solution following the procedure of W. Ewing and H. Rasmussen, *The Temperature-Composition Relations of the Binary System Manganous Nitrate-Water* J. Amer. Chem. Soc. 64, 1443 (1942). Such manganous nitrate solution is available commercially.

Forty grams of the manganous nitrate hexahydrate produced was placed in a 500 ml conical flask equipped with a two hole rubber stopper. The flask was connected to an oxygen tank through one of the holes, while the other provided a gas outlet. The gas leaving the flask was bubbled through an oil filled trap.

The flask was placed in a furnace and the temperature was raised from room temperature to 150° C. over a 20 minute period. During this period dry oxygen was fed into the flask directly from the tank at the rate of about 1 cubic ft/hour.

When the temperature reached 150° C., the system was maintained at this temperature for a period of about two hours. The temperature was then raised to about 250° C. over a half hour period. Throughout this entire period (i.e. the 2-hour hold at 150° C. and the subsequent raising of the temperature to 250° C.) dry oxygen continued to flow into the flask directly from the tank at the rate of about 1 cubic ft/hr.

The temperature of the flask was maintained at 250° C. for two hours, and was then allowed to cool to room temperature. Dry oxygen was continually fed into the reactor during this period.

The reaction product weighed 11.57 grams and elemental analysis revealed that such product was manganese dioxide of the formula $MnO_{1.97}$. The surface area of such product was found to be 1 $m^2/gm$ by conventional nitrogen gas adsorption.

EXAMPLE 2

Using the apparatus employed in Example 1, forty grams of manganous nitrate hexahydrate were treated in a process similar to that disclosed in Example 1 except that air was fed into the flask rather than oxygen. This resulted in the production of 11.83 grams of product, which elemental analysis revealed to be manganese dioxide having a formula of $MnO_{1.92}$. This material possessed a surface area of 1.2 $m^2/gm$.

EXAMPLE 3

Forty grams of manganous nitrate hexahydrate were treated as in Example 1, except that the oxygen was bubbled through water prior to its entry into the flask during the two hour hold at 150° C., during the elevation period to 250° C., during the two hour hold at 250° C., and during the cool down period until the temperature had dropped to 150° C. This resulted in the production of 11.63 grams of product. Elemental analysis indicated that the product was manganese dioxide of the formula $MnO_{1.97}$. This material possessed a surface area of 1.1 $m^2/gm$.

EXAMPLE 4

Forty grams of manganous nitrate hexahydrate were treated as in Example 3, except that air was used in place of oxygen for the entire process. This resulted in the production of 11.71 grams of product, which was analyzed to be manganese dioxide of the formula $MnO_{1.93}$. This material possessed a surface area of 0.9 $m^2/gm$.

EXAMPLES 5-8

Manganese dioxide was produced following the procedure of Example 1 utilizing the manganous nitrate starting materials listed in Table II. These hydrates of manganous nitrate were prepared by the dehydration of a 50% manganous nitrate solution following the procedure of W. Ewing and H. Rasmussen, cited in Example 1 above. The surface areas of such products are also listed in Table II.

TABLE II

| | STARTING MATERIAL* | | |
|---|---|---|---|
| Example | $Mn(NO_3)_2 \cdot 6H_2O$ | $Mn(NO_3)$ (anhydrous) | Surface Area ($m^2/gm$) |
| 5 | 90 | 10 | 0.80 |
| 6 | 75 | 25 | 0.70 |
| 7 | 50 | 50 | 1.00 |
| 8 | 25 | 75 | 3.37 |

*Weight percent

COMPARATIVE EXPERIMENT A

In order to test the water pickup of the manganese dioxide produced the following test was run. $MnO_2$ samples from Examples 1 and 3 were stored in an oven overnight at 150° C. The materials were transferred to a dry box having a water content of approximately 10-50 parts per million and allowed to cool to room temperature. The samples were then removed and exposed to air having a water content of about 20% relative humidity. After 5 hours of exposure time, 2.5 grams of the samples were mixed with 10 milliliters of an electrolyte (composed of 40 volume percent dioxolane; 30 volume percent dimethoxyethane; 30 volume percent 3-methyl-2-oxazolidone with a trace (less than 0.2 volume percent) of 3,5-dimethylisoxazole and 1 mole of lithium trifluoromethyl sulfonate added per liter of solvent) in order to leach the water from the $MnO_2$. After stirring and filtering, an aliquot of electrolyte was analyzed for water using the Karl-Fischer Method. This water analysis was done automatically using a Photovolt Aquatest IV TM. The reported $MnO_2$ water content was corrected for the water content of the electrolyte. The samples tested indicated a water pickup of no more than 400 parts per million after 5 hours exposure to a 20% relative humidity atmosphere. As a comparison, the water pickup for heat-treated Tekkosha TM EMD, previously heated for 3 hours at 360° C. in air, was found to be about 4,000 parts per million after 5 hours in a 20% relative humidity atmosphere.

COMPARATIVE EXPERIMENT B

Several button cells using cathodes made up of the $MnO_2$ produced in Example 1, a lithium anode and the electrolyte described in comparative Experiment A above were prepared. As a comparison, several cells were made with Tekkosha TM EMD which was heat-treated as described in Comparative Experiment A. The cells had an initial height of 0.060 inch. As is well known in the art, moisture present in the MnO₂ will react with lithium and/or the nonaqueous electrolyte which will generally result in the cell bulging from its initial height. Thus, the degree of bulging is proportional to the amount of water absorbed by the manganese dioxide during cell assembly. The results of such testing are shown in Table III.

TABLE III

|  | No. of Cells | Average Cell Height (after 1 day |
|---|---|---|
| EMD, Dry Box* | 10 | 0.060" |
| EMD, Dry Room** | 5 | 0.081" |
| Example 1 MnO₂, Dry Box* | 12 | 0.062" |
| Example 1 MnO₂, Dry Room** | 12 | 0.064" |

*Having a water content of 10-50 ppm
**Having a relative humidity of 1.5-2.5%

The results above indicate that cells prepared in a dry room with the manganese dioxide of the instant invention exhibit much less bulging than do cells containing EMD. This is indicative of the greater resistance to water pickup of the manganese dioxide of the instant invention.

COMPARATIVE EXPERIMENT C

A flat-type cell was constructed utilizing a stainless steel base having therein a shallow depression into which the cell contents were placed and over which a spring-loaded stainless steel plate was placed. The contents of the cell consisted of 40 milligrams of lithium; about 1.5 ml of an electrolyte consisting of about 40 volume percent 1,3-dioxolane, about 30 volume percent 1,2-dimethoxyethane, about 30 volume percent 3-methyl-2-oxazolidone plus a trace (less than 0.2 volume percent) of 3,5-dimethylisoxazole and containing 1 mole per liter of solvent of LiCF₃SO₃; a nonwoven polypropylene separator, which absorbed some of the electrolyte; anc 0.35 gram of a cathode mix which consisted of 86.2 weight percent manganese dioxide (produced as described in Example 1), 8.5 weight percent graphite, 2.1 weight percent acetylene black and 3.2 weight percent polytetrafluoroethylene.

Tests were run at 21° C. and 35° C. until a 2.0 volt cutoff. Load resistors of 30,000 ohms (0.1 mA/cm² cathode current density) were used for continuous discharge and a superimposed load of 250 ohms for 2 seconds once every 3 days for a pulse discharge. The manganese dioxide delivered a 90% efficiency (on 1 electron) to a 2 volt cutoff at 21° C. and an efficiency of 86.3% at 35° C.

What is claimed is:

1. Manganese dioxide having a surface area no greater than about 15 square meters/gram and having an X-ray diffraction pattern indicating relative intensities, when compared with crystalline beta manganese dioxide, of no greater than about 30% at d value 3.12 Å, of no greater than about 80% at d value 2.41 Å, of no greater than about 65% at d value 1.63 Å0 and of no greater than about 65% at d value 1.31 Å.

2. The manganese dioxide of claim 1 wherein the surface area is no greater than about 10 square meters/gram.

3. The manganese dioxide of claim 1 wherein the surface area is no greater than about 5 square meters/gram.

4. The manganese dioxide of claim 1 wherein said manganese dioxide will not pick up more than about 750 parts per million of water in 5 hours when exposed to an atmosphere possessing a relative humidity of 20% at a temperature of 21° C.

5. A process for the production of manganese dioxide from manganous nitrate hexahydrate-containing material comprising the steps of:
   (a) heating in an oxygen-containing atmosphere manganous nitrate hexahydrate-containing material to between about 120° C. and about 180° C. until a substantially complete decomposition of the manganous nitrate into manganese dioxide has occurred; and
   (b) further elevating the temperature to between about 210° C. and about 300° C., and maintaining this temperature until the manganese dioxide has a surface area of no greater than about 15 m²/gm and an X-ray diffraction pattern indicating relative intensities, when compared with crystalline beta manganese dioxide, of no greater than about 30% at d value 3.12 Å, no greater than about 80% at d value 2.41 Å, no greater than about 65% at d value 1.63 Å and no greater than about 65% at d value 1.31 Å.

6. The process of claim 5 wherein the temperature in step (a) is maintained for a period of between about 1 and about 4 hours.

7. The process of claim 6 wherein the temperature in step (b) is maintained for a period of between about 1 and about 4 hours.

8. The process of claim 5 wherein the temperature in step (a) is about 150° C., and such temperature is maintained for a period of about 2 hours.

9. The process of claim 8 wherein the temperature is elevated in step (b) to 250° C. and maintained at this temperature for about 2 hours.

* * * * *

UNITED STATES PATENT AND TRADEMARK OFFICE
CERTIFICATE OF CORRECTION

PATENT NO. : 4,476,104  
DATED : Oct. 9, 1984  
INVENTOR(S) : Geoffrey W. Mellors It is certified that error appears in the above-identified patent and that said Letters Patent is hereby corrected as shown below:

Column 4, line 61, under the line after Table 1, insert footnote as follows:

-- $^1$Intensities listed to nearest 50 units --.

-- $^2$Relative Intensity = $I/I_o \times 100$ --.

Column 6, line 52 "IV TM" should read -- $IV^{TM}$ --.

Column 6, line 57 "Tekkosha TM" should read -- $Tekkosha^{TM}$ --.

Column 6, line 67 "Tekkosha TM" should read -- $Tekkosha^{TM}$ --.

Column 8, line 8 of Claim 1, "greater than about 65% at d value 1.31 Å." should read as follows:

-- greater than about 65% at d value 1.31 Å such X-ray diffraction pattern having its highest peak at 1.63 Å and its second highest peak at 2.41 Å. --.

UNITED STATES PATENT AND TRADEMARK OFFICE
CERTIFICATE OF CORRECTION

PATENT NO. : 4,476,104

DATED : Oct. 9, 1984

INVENTOR(S) : Geoffrey W. Mellors

It is certified that error appears in the above-identified patent and that said Letters Patent is hereby corrected as shown below:

Column 8, line 20 of Claim 5, "1.13 $\overset{\circ}{A}$." should read as follows:

-- 1.13 $\overset{\circ}{A}$ such X-ray diffraction pattern having its highest peak at 1.63 $\overset{\circ}{A}$ and its second highest peak at 2.41 $\overset{\circ}{A}$. --.

Signed and Sealed this

Sixteenth Day of April 1985

[SEAL]

Attest:

DONALD J. QUIGG

Attesting Officer

Acting Commissioner of Patents and Trademarks